Figure 7:
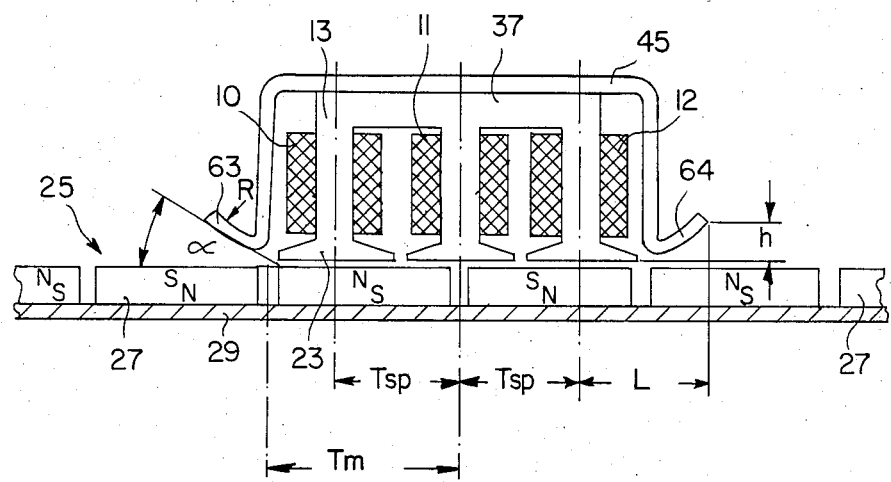

United States Patent [19]

von der Heide

[11] Patent Number: 4,638,192

[45] Date of Patent: Jan. 20, 1987

[54] LINEAR DC MOTOR

[75] Inventor: Johann von der Heide, Schramberg, Fed. Rep. of Germany

[73] Assignee: Papst-Motoren GmbH & Co. KG, St. Georgen, Fed. Rep. of Germany

[21] Appl. No.: 448,681

[22] Filed: Dec. 10, 1982

[30] Foreign Application Priority Data

Dec. 11, 1982 [DE] Fed. Rep. of Germany ....... 3149214

[51] Int. Cl.$^4$ ............................................. H02K 41/00
[52] U.S. Cl. ....................................... 310/12; 318/135
[58] Field of Search ...................................... 310/12–19, 310/30; 318/135

[56] References Cited

U.S. PATENT DOCUMENTS

| 3,663,844 | 5/1972 | Kant ........................................ 310/13 |
| 3,860,839 | 1/1975 | Buchberger ............................ 310/12 |
| 4,369,383 | 1/1983 | Langley ................................. 310/12 |

Primary Examiner—Donovan F. Duggan
Attorney, Agent, or Firm—Fitch, Even, Tabin & Flannery

[57] ABSTRACT

In line DC motor with a permanent magnet arrangement displaying a ferromagnetic ground and a multi-strand winding, which are linearly moveable with respect to one another, in particular for drives in data engineering. The winding consists of several coils following one another in the direction of movement, activatable with current in cyclic sequence, which in each case are layed without overlap around a pole of at least one grooved flow guidance part which together with the permanent magnet arrangement forms an essentially even air gap, with coil axis standing perpendicular to the direction of movement. The ratio of coil interval to magnet interval amounts to 2:3. To make interfering reluctance forces ineffective, in the vicinity of the sides of the end poles lying in the direction of movement, ferromagnetic auxilliary poles are provided.

10 Claims, 8 Drawing Figures

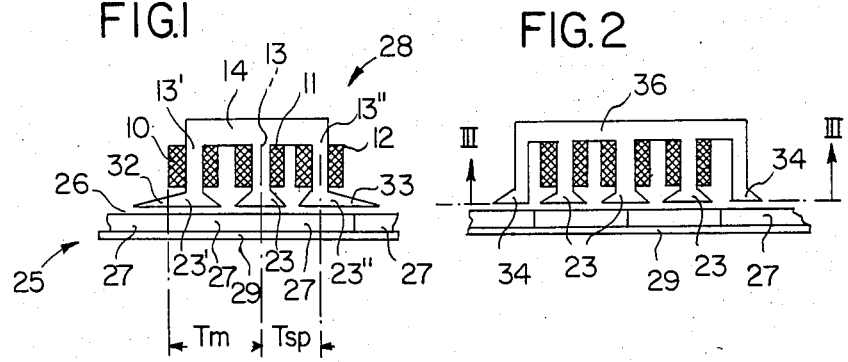

LINEAR DC MOTOR

The invention relates to a linear DC motor comprising permanent magnets arranged on a ferromagnetic flux-return structure and a multiple-wire winding which is moveable in relation to said magnet arrangement, in particular for drives in data processing, where the winding consists of several coils which are sequentially arranged in the direction of the motion and which are sequentially energized in cycles, where each of the coils is wrapped without overlap around a pole of at least one slotted flux-conducting part which in conjunction with the permanent magnet arrangement forms an essentially even air gap, where the coil axis is perpendicular to the direction of motion, and where the ratio of intercoil pitch to intermagnet pitch is 2:3, as described in U.S. Ser. No. 757,919, now allowed, which is a continuation of U.S. Ser. No. 583,094, now abandoned, which is a continuation of U.S. Ser. No. 272,922, now abandoned.

The primary patent application, U.S. Ser. No. 757,919, which is here referred to in full in order to avoid repetitions, proceeds from a known linear DC motor (U.S. Pat. No. 4,151,447) where on the inner side of at least one of two parallel ferromagnetic guides there is a row of magnets which have alternating polarity and are arranged perpendicular to the longitudinal direction. A current-carrying coil arrangement which is moveable in relation to the guides has at least two flat coils between the one row of magnets and the other magnetic guide or between the rows of magnets of both guides, said flat coils being staggered in the longitudinal direction, and where the broadside of said coils is parallel to the direction of motion of said coils and where the ratio of intercoil pitch to intermagnet pitch is 4:3 for a triple-wire motor.

The aforementioned solution described in the primary patent provides for a linear DC motor which can be constructed very simply with a small air gap and which is therefore highly efficient. However, even with the linear DC motor described in the primary patent, the external end surfaces of the winding poles which are located in the direction of the motion capture additional magnetic fields. Since both end surfaces are symmetrical only when the winding poles are in a certain position relative to the magnetic poles, relatively strong reluctance forces are created which impede armature movement.

The present invention intends to at least partially eliminate these interfering reluctance forces in a multiphase linear motor with salient winding poles.

The invention obtains this object by attaching ferromagnetic auxiliary poles at the end pole sides which are located in the direction of motion. By utilizing this type of auxiliary poles the reluctance forces can be eliminated to the largest possible extent.

The auxiliary poles can be formed by lengthening the outer part of the end pole shoes. However, auxiliary poles separate from the winding poles are also possible. In the latter case, it is advantageous to form the auxiliary poles with the ends of a U-shaped ferromagnetic part, said ends being bent outward, preferably at a right angle. When viewed along an axis perpendicular to the motion plane of the armature, the auxiliary poles can be rectangular. However, auxiliary poles which are wedge-shaped in the direction of motion proved to be particularly useful. In a preferred further embodiment of the invention the air gap between the auxiliary poles and the pole area of the permanent magnet arrangement is also wedge-shaped. The height of the bend of the auxiliary poles can be 0.1 to 0.5 times the intercoil pitch and is preferably essentially equal to 0.2 times the intercoil pitch. The extended length (overhang) of the auxiliary poles is preferably 0.8 to 1.2 times the intercoil pitch. The auxiliary poles can be curved in the direction of motion with a curvature radius which should be 0.2 to 3 times the intercoil pitch. It is advantageous to have the slope angle of the wedge-shaped auxiliary poles at 10° to 40°, while the average wedge angle formed between the auxiliary poles and the pole area of the permanent magnet arrangement should preferably be between 20° and 50°.

Moreover, as with the motor of the primary patent the winding poles are essentially T-shaped for an efficient magnetic flux. The magnetic pole width in the direction of motion should be at least equal to the intercoil pitch, while the winding is preferably a triple-wire one.

The magnet arrangement can be stationary, while the armature has at least three winding poles sequentially arranged in the direction of motion, each with its separate coil. In such a case, at least two flux-conducting parts each with its separate coil can be located symmetrically on opposite sides of the magnet arrangement. However, it is also possible to provide only one armature flux-conducting part which should be arranged relative to the magnet arrangement and a load connected with the armature such that the joint center of gravity of the armature and the load is closer to the air gap and/or an armature guide than either the load center of gravity or the armature center of gravity alone.

In a modification of the embodiment the magnet arrangement can be configured as an armature. A guide bar can be provided at each side of the armature, upon which the armature is placed by means of a three-point support, which support is preferably provided with two double cone rollers located at a distance from one another in the armature direction of motion and interacting with the one guide bar, and is further provided with a cylindrical roller interacting with the other guide bar. In this case, the magnetic pull can be utilized for guidance. The rollers can be positioned in a frame in such a way that they can be turned, where said frame at the side of the guide bars facing away from the rollers carries a safety stop, for instance in the form of projections extending over the guide bars.

The motor can be configured brushless, and an electronic commutation means can be provided with which the coils are energized in cyclical sequence depending upon the armature position. If in such a case the alternating poles of the permanent magnet arrangement along the armature line of motion follow one another more or less without a spacing between them, the commutation means can have magnetic field sensitive armature position sensors located in the direct field of the permanent magnet arrangement, for instance Hall generators, field plates, magnetodiodes, or Hall ICs with bistable switching. However, in principle, optical or mechanical commutation sensors can also be used. With a stationary magnet arrangement, for instance, commutation can occur via conducting segments arranged in parallel in the intermagnet pitch and three brushes, located in the intercoil pitch, in order to obtain a linear brush motor.

Particularly advantageous is a non-parallel arrangement of the spacings between the permanent magnet poles and the poles of the slotted flux-conducting part, which spacings are located opposite each other at the air gap, for instance, by sloping the spacings between the magnet poles or by providing a different slope angle for the spacings between the magnet poles and the slots.

Below, the invention is explained further using examples of preferred embodiments. The attached drawings show:

FIG. 1 A schematic side view of a linear DC motor according to the invention.

Figure 8:
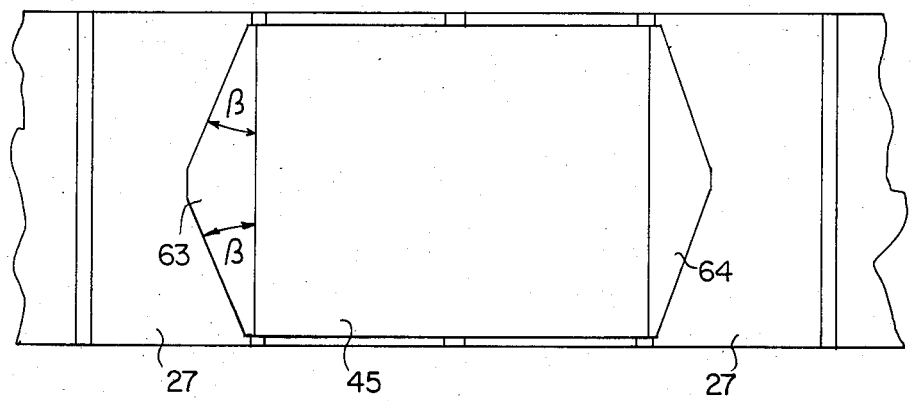

FIG. 2 a side view similar to FIG. 1 for one embodiment with separate auxiliary poles, FIG. 3 a view corresponding to line III—III of FIG. 2, FIG. 4 a side view similar to FIG. 2, FIG. 5 a view corresponding to line V—V of FIG. 4, FIG. 6 a side view for another modified embodiment, FIG. 7 a side view similar to FIG. 6, and FIG. 8 a top view of the arrangement according to FIG. 7.

The linear motors illustrated in the figures have a three wire arrangement. The three winding wires are formed by coils 10, 11, 12 respectively, each of which is wrapped without overlap around a T-shaped winding pole 13, 13', or 13" respectively of a slotted flux-conducting part 14 which can be, for instance, a sheet metal stack or a sintered compact. Pole shoes 23, 23', 23" of poles 13, 13', 13" together with a magnet arrangement 25 define an even air gap 26. Magnet arrangement 25 consists of a row of magnetic plates 27, which are alternately magnetized in a direction perpendicular to the direction of motion of an armature 28 which armature is essentially formed by the flux-conducting part 14 and coils 10 to 12.

In FIG. 1, Tsp denotes the intercoil pitch and Tm denotes the intermagnet pitch. The ratio between the two pitches is 2:3. Magnetization in the armature direction of motion occurs essentially in the form of a rectangle or trapezoid. The permanent magnet pole width should be at least equal to the size of the intercoil pitch Tsp. A ferromagnetic flux-return structure 29 is located above magnetic plates 27. The individual magnetic plates 27 can be replaced by a permanent magnetic strip with alternating polarity. The material suitable for magnetic arrangement 25 includes plastic-composite magnets or so-called rubber magnets, i.e. mixtures consisting of hard ferrites and elastic material. However, ceramic magnets or magnets made of samarium cobalt can also be used.

An electronic commutation means (not shown in the figure) already known in the art (see, for instance, U.S. Pat. No. 4,141,447) can be present to energize coils 10, 11, 12. Suitable magnetic field sensitive armature position sensors are Hall generators, Hall ICs, field plates, magnetodiodes, etc., which are located directly in the field of the magnet arrangement.

In order to suppress interfering reluctance forces, in the embodiment according to FIG. 1 the outer parts of pole shoes 23', 23" of end poles 13', 13" are extended, thus forming auxiliary poles 32, 33. In the modified embodiment according to FIGS. 2 and 3 pole shoes 23 have identical shapes. Poles 34 which are separate from winding poles 13 are configured as auxiliary poles and are located in the direction of motion at both ends of flux-conducting part 36. As indicated in FIG. 3, when viewed along an axis perpendicular to the direction of motion of the armature or to the plane of air gap 26, auxiliary poles 34 are rectangular.

The embodiment according to FIGS. 4 and 5 has a flux-conducting part 37 forming winding poles 13 and additionally provides for a U-shaped ferromagnetic part 45 extending over flux-conducting part 37 and coils 10 to 12. Ends 57, 58 of this part are bent outward at a right angle thus forming the auxiliary poles. As shown in FIG. 5, auxiliary poles 57, 58 are wedge-shaped in the direction of motion.

The embodiment according to FIG. 6 is identical to those in FIGS. 4 and 5 with the exception that auxiliary poles 59, 60 are not parallel to the outer side of magnetic plates 27, said side facing the auxiliary poles, but are at an angle such that air gaps 61, 62 between auxiliary poles 59, 60 and the pole areas of magnetic plates 27 are wedge-shaped.

The embodiment according to FIGS. 7 and 8 is again very similar to the one according to FIG. 6. The ends of U-shaped ferromagnetic part 45 are bent at a bend radius R in order to form auxiliary poles 63, 64, where the extended length 1 of auxiliary poles 63, 64 is 0.8 to 1.2 times the intercoil pitch Tsp and where the height of bend h of the auxiliary poles is 0.2 to 0.5 times and preferably essentially 0.2 times the intercoil pitch Tsp. Advantageously, bend radius R is 0.2 to 3 times the intercoil pitch T, while the average wedge angle $\alpha$ should best amount to between 20° and 50° and the slope angle $\beta$ of the symmetrically wedge-shaped auxiliary poles 63, 64 to between 10° and 40°.

It is understood that the winding can also be stationary and that the armature can be formed by the permanent magnet arrangement. Furthermore, a mechanical arrangement as illustrated and explained in detail in the primary patent can be used.

What is claimed is:

1. A direct current linear motor, particularly for use in data processing drive systems, said motor comprising:

a permanent magnetic system formed of a plurality of permanent magnet poles disposed linearly adjacent each other;

a ferromagnetic structure formed of at least one slotted flux-carrying member and a multi-strand winding formed into a plurality of coils, the coils disposed linearly adjacent each other on the flux-carrying member, the coils being energized in cyclic sequence and each said coil wound without overlap around a pole of the at least one flux-carrying member between adjacent slots thereof forming a multi-phase d.c. structure, each pole terminating in a shoe at one of its ends;

a flat air gap defined between and separating said permanent magnetic system and the pole shoes of said ferromagnetic structure, said permanent magnetic system and said ferromagnetic structure being linearly movable relative to each other in their longitudinal direction, the axis of each said coil of said ferromagnetic structure extending perpendicular to the direction of movement; and an auxiliary ferromagnetic pole at each end of said ferromagnetic structure with respect to the direction of movement thereof to substantially reduce or eliminate reluctance forces tending to impede relative movement between said permanent magnetic system and said ferromagnetic structure, said auxiliary ferromagnetic pole being formed by an additional pole separate from the winding poles at each end of said ferromagnetic structure, the auxiliary poles being formed from outwardly extending bent ends of a U-shaped ferromagnetic part that provides said additional poles, and the upward bend height of the auxiliary poles being 0.1–0.5 times and preferably about 0.2 times the intercoil pitch of the ferromagnetic structure.

2. Linear DC motor according to claim 1 wherein the auxiliary poles are bent out at a right angle from the U-shaped ferromagnetic part.

3. A direct current linear motor, particularly for use in data processing drive systems, said motor comprising:
- a permanent magnetic system formed of a plurality of permanent magnet poles disposed linearly adjacent each other;
- a ferromagnetic structure formed of at least one slotted flux-carrying member and a multi-strand winding formed into a plurality of coils, the coils disposed linearly adjacent each other on the flux-carrying member, the coils being energized in cyclic sequence and each said coil wound without overlap around a pole of the at least one flux-carrying member between adjacent slots thereof forming a multi-phase d.c. structure, each pole terminating in a shoe at one of its ends;
- a flat air gap defined between and separating said permanent magnetic system and the pole shoes of said ferromagnetic structure,
- said permanent magnetic system and said ferromagnetic structure being linearly movable relative to each other in their longitudinal direction, the axis of each said coil of said ferromagnetic structure extending perpendicular to the direction of movement; and
- an auxiliary ferromagnetic pole at each end of said ferromagnetic structure with respect to the direction of movement thereof to substantially reduce or eliminate reluctance forces tending to impede relative movement between said permanent magnetic system and said ferromagnetic structure,
- the auxiliary poles being formed by lengthening the outer part of the end pole shoes, and the projecting length of the auxiliary poles being 0.8 to 1.2 times the intercoil pitch of the ferromagnetic structure.

4. A direct current linear motor, particularly for use in data processing drive systems, said motor comprising:
- a permanent magnetic system formed of a plurality of permanent magnet poles disposed linearly adjacent each other;
- a ferromagnetic structure formed of at least one slotted flux-carrying member and a multi-strand winding formed into a plurality of coils, the coils disposed linearly adjacent each other on the flux-carrying member, the coils being energized in cyclic sequence and each said coil wound without overlap around a pole of the at least one flux-carrying member between adjacent slots thereof forming a multi-phase d.c. structure, each pole terminating in a shoe at one of its ends;
- a flat air gap defined between and separating said permanent magnetic system and the pole shoes of said ferromagnetic structure,
- said permanent magnetic system and said ferromagnetic structure being linearly movable relative to each other in their longitudinal direction, the axis of each said coil of said ferromagnetic structure extending perpendicular to the direction of movement; and
- an auxiliary ferromagnetic pole at each end of said ferromagnetic structure with respect to the direction of movement thereof to substantially reduce or eliminate reluctance forces tending to impede relative movement between said permanent magnetic system and said ferromagnetic structure, the air gap between the auxiliary poles and the pole surface of the permanent magnet system being wedge-shaped, the auxiliary poles being bent in the direction of movement, and the auxiliary poles including a bend radius of the auxiliary poles that is 0.2 to 3 times the intercoil pitch of the ferromagnetic structure.

5. Linear DC motor according to claim 4, wherein the wedge-shaped auxiliary poles include a slope angle of 10° to 40°.

6. Linear DC motor according to claim 5, wherein the average wedge angle formed between the auxiliary poles and the pole surface of the permanent magnet arrangement amounts to 20° to 50°.

7. A direct current linear motor, particularly for use in data processing drive systems, said motor comprising:
- a permanent magnetic system formed of a plurality of permanent magnet poles disposed linearly adjacent each other;
- a ferromagnetic structure formed of at least one slotted flux-carrying member and a multi-strand winding formed into a plurality of coils, the coils disposed linearly adjacent each other on the flux-carrying member, the coils being energized in cyclic sequence and each said coil wound without overlap around a pole of the at least one flux-carrying member between adjacent slots thereof forming a multi-phase d.c. structure, each pole terminating in a shoe at one of its ends;
- the intercoil pitch of said ferromagnetic structure being related to the interpole pitch of said permanent magnet system by a ratio of 2:3,
- a flat air gap defined between and separating said permanent magnetic system and the pole shoes of said ferromagnetic structure,
- said permanent magnetic system and said ferromagnetic structure being linearly movable relative to each other in their longitudinal direction, the axis of each said coil of said ferromagnetic structure extending perpendicular to the direction of movement; and
- an auxiliary ferromagnetic pole at each end of said ferromagnetic structure with respect to the direction of movement thereof to substantially reduce or eliminate reluctance forces tending to impede relative movement between said permanent magnetic system and said ferromagnetic structure.

8. A direct current linear motor, particularly for use in data processing drive systems, said motor comprising:
- a permanent magnetic system formed of a plurality of permanent magnet poles disposed linearly adjacent each other;
- a ferromagnetic structure formed of at least one slotted flux-carrying member and a multi-strand winding formed into a plurality of coils, the coils disposed linearly adjacent each other on the flux-carrying member, the coils being energized in cyclic sequence and each said coil wound without overlap around a pole of the at least one flux-carrying member between adjacent slots thereof forming a multi-phase d.c. structure, each pole terminating in a shoe at one of its ends;

a flat air gap defined between and separating said permanent magnetic system and the pole shoes of said ferromagnetic structure said, said permanent magnetic system and said ferromagnetic structure being linearly movable relative to each other in their longitudinal direction, the axis of each said coil of said ferromagnetic structure extending perpendicular to the direction of movement; and an auxiliary ferromagnetic pole at each end of said ferromagnetic structure with respect to the direction of movement thereof to substantially reduce or eliminate reluctance forces tending to impede relative movement between said permanent magnetic system and said ferromagnetic structure, said auxiliary ferromagnetic pole being formed by an additional pole separate from the winding poles at each end of said ferromagnetic structure, the projecting length of the auxiliary poles being 0.8 to 1.2 times the intercoil pitch of the ferromagnetic structure.

9. Linear DC motor according to claim 8 wherein the auxiliary poles are formed from outwardly extending bent ends of a U-shaped ferromagnetic part that provides said additional poles.

10. Linear DC motor according to claim 9 wherein the auxiliary poles are bent out at a right angle from the U-shaped ferromagnetic part.

* * * * *

UNITED STATES PATENT AND TRADEMARK OFFICE
CERTIFICATE OF CORRECTION

PATENT NO. : 4,638,192

DATED : January 20, 1987

INVENTOR(S) : Johann von der Heide

It is certified that error appears in the above-identified patent and that said Letters Patent is hereby corrected as shown below:

Abstract, Line 16, change "auxilliary" to --auxiliary--.
Col. 1, Line 39, after "patent" insert --application--.
Col. 1, Line 42, after "patent" insert --application--.
Col. 2, Line 16, after "patent" insert --application--.
Col. 3, Line 11, change "A" to --is a--.
Col. 3, Line 13, after "Fig. 2" insert --is--.
Col. 3, Line 15, after "Fig. 3" insert --is--.
Col. 3, Line 17, after "Fig. 4" insert --is--.
Col. 3, Line 18, after "Fig. 5" insert --is--.
Col. 3, Line 19, after "Fig. 6" insert --is--.
Col. 3, Line 20, after "Fig. 7" insert --is--.
Col. 3, Line 21, after "Fig. 8" insert --is--.
Col. 3, Line 54, change "present" to --provided--.
Col. 4, Lines 6-7, delete "part 37 and coils 10 to 12. Ends 57, 58 of this part are bent".
Col. 4, Line 29, after "angle β" insert --(Fig. 8)--.
Col. 4, Line 35, after "patent" insert --application--.

UNITED STATES PATENT AND TRADEMARK OFFICE
CERTIFICATE OF CORRECTION

PATENT NO. : 4,638,192

DATED : January 20, 1987

INVENTOR(S) : Johann von der Heide

It is certified that error appears in the above-identified patent and that said Letters Patent is hereby corrected as shown below:

```
Col. 3, Line 12, change "." (period) to --,-- (comma).
Col. 4, Line 27, change "T" to --Tsp--.
Col. 7, Line 8, after "structure" delete "said".
```

Signed and Sealed this

Eighth Day of September, 1987

Attest:

DONALD J. QUIGG

*Attesting Officer*  *Commissioner of Patents and Trademarks*